(12) United States Patent
Takahashi et al.

(10) Patent No.: US 8,928,868 B2
(45) Date of Patent: Jan. 6, 2015

(54) OPTICAL FIBER LINE CHARACTERISTIC ANALYSIS APPARATUS AND ANALYSIS METHOD THEREOF

(75) Inventors: Hiroshi Takahashi, Tsukuba (JP); Fumihiko Ito, Tsukuba (JP); Xinyu Fan, Tsukuba (JP); Yusuke Koshikiya, Tsukuba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 14/119,115

(22) PCT Filed: May 31, 2012

(86) PCT No.: PCT/JP2012/064190
§ 371 (c)(1),
(2), (4) Date: Nov. 20, 2013

(87) PCT Pub. No.: WO2012/165587
PCT Pub. Date: Dec. 6, 2012

(65) Prior Publication Data
US 2014/0098362 A1    Apr. 10, 2014

(30) Foreign Application Priority Data

May 31, 2011 (JP) ................. 2011-122509

(51) Int. Cl.
*G01N 21/00* (2006.01)
*G01M 11/00* (2006.01)

(52) U.S. Cl.
CPC ........ *G01M 11/3109* (2013.01); *G01M 11/319* (2013.01)
USPC ...................................... 356/73.1

(58) Field of Classification Search
CPC ....... G01L 1/242; G01L 1/246; G01L 11/025; G01L 1/243; G01M 11/319; G01M 5/0091; G01M 11/086; G01M 11/3109; G01M 11/083; G01M 11/085; G01M 11/3127; G01M 11/3172; G01M 5/0025; G01M 11/088
See application file for complete search history.

(56) References Cited

U.S. PATENT DOCUMENTS

2010/0165327 A1* 7/2010 Hartog ......................... 356/73.1
2013/0229649 A1* 9/2013 Li et al. ........................ 356/73.1

(Continued)

FOREIGN PATENT DOCUMENTS

JP    64-086032 A    3/1989
JP    2-186236 A     7/1990

(Continued)

OTHER PUBLICATIONS

International Search Report and Written Opinion of the ISA for PCT/JP2012/064190, ISA/JP, mailed Jul. 17, 2012.

(Continued)

*Primary Examiner* — Michael P Stafira
(74) *Attorney, Agent, or Firm* — Harness, Dickey & Pierce, PLC

(57) ABSTRACT

A test pulse is generated from a first and a second test light beam pulse with different wavelengths, with a predetermined time difference applied between the first and the second test light beam pulse. A circulator inputs the test pulse to a trunk fiber of a measurement target fiber line. A reflected light is extracted which is output from an input end of the trunk fiber. A filter extracts stimulated Brillouin backscattered light. A receiver receives and converts the scattered light into an electrical signal. A processing device carries out the signal to determine in which of N branched fibers the stimulated Brillouin scattered light is generated, while varying a time difference between the first and the second test pulse.

8 Claims, 14 Drawing Sheets

(56) References Cited

U.S. PATENT DOCUMENTS

2013/0271769 A1* 10/2013 Handerek .................. 356/446
2013/0301037 A1* 11/2013 Handerek .................. 356/73.1

FOREIGN PATENT DOCUMENTS

| JP | 2-251729 A | 10/1990 |
| JP | 07-087017 A | 3/1995 |
| JP | 2007-155409 A | 6/2007 |
| JP | 2007-240287 A | 9/2007 |
| JP | 2008-216123 A | 9/2008 |

OTHER PUBLICATIONS

Y. Enomoto et al., "Over 31.5dB dynamic range optical fiber line testing system with optical fiber fault isolation function 32dB-branched PON", OFC2003 Technical Digest, paper ThAA3(2003), pp. 608-610.

* cited by examiner

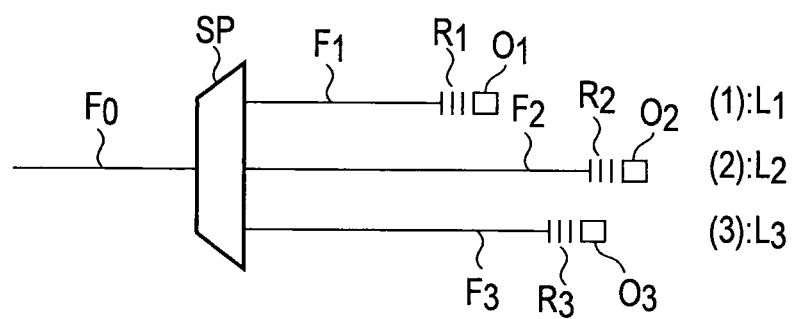
F I G. 3A
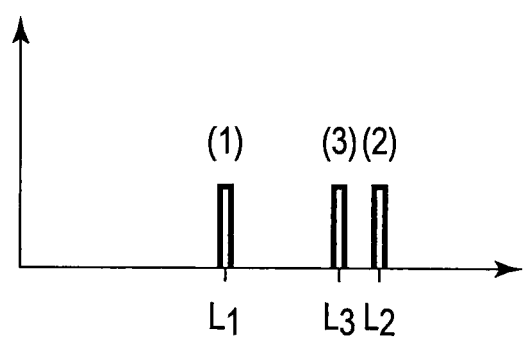
F I G. 3B

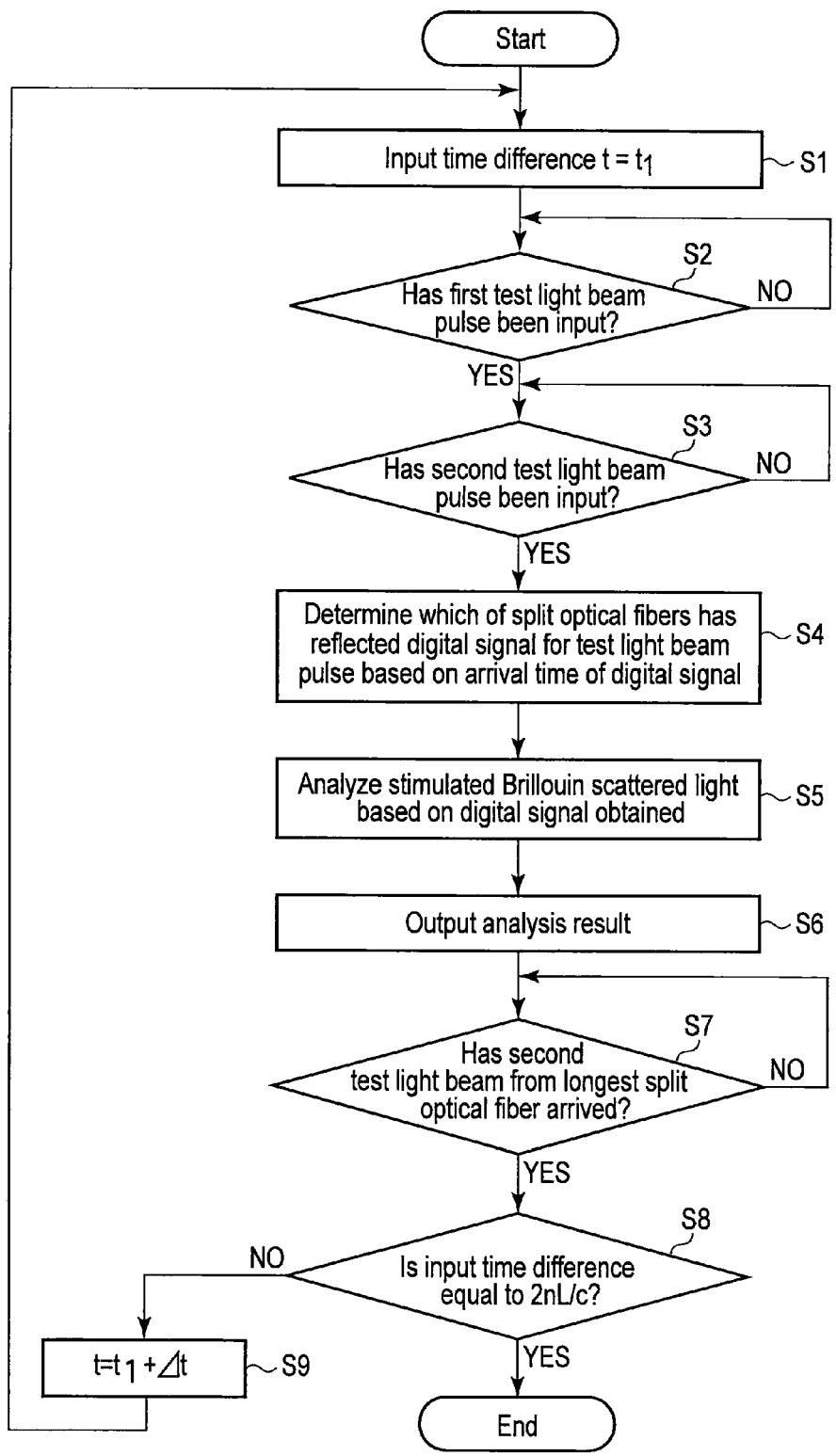
F I G. 4

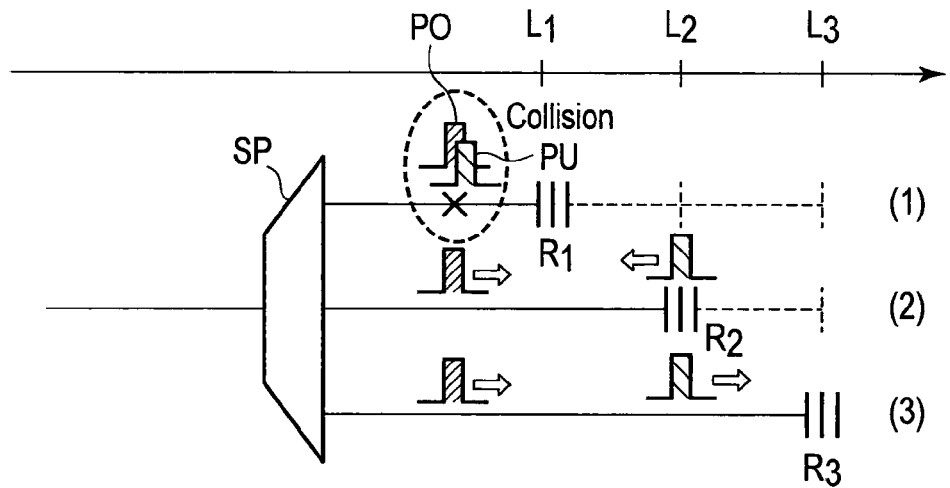
F I G. 9
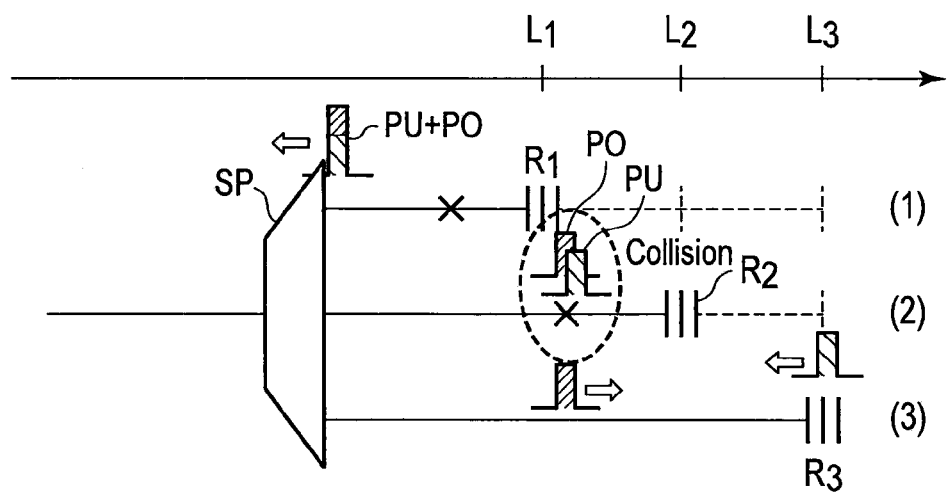
F I G. 10

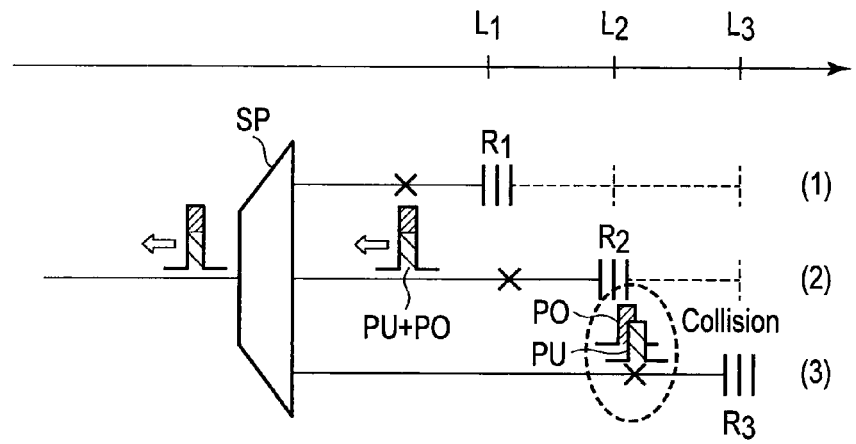
F I G. 11
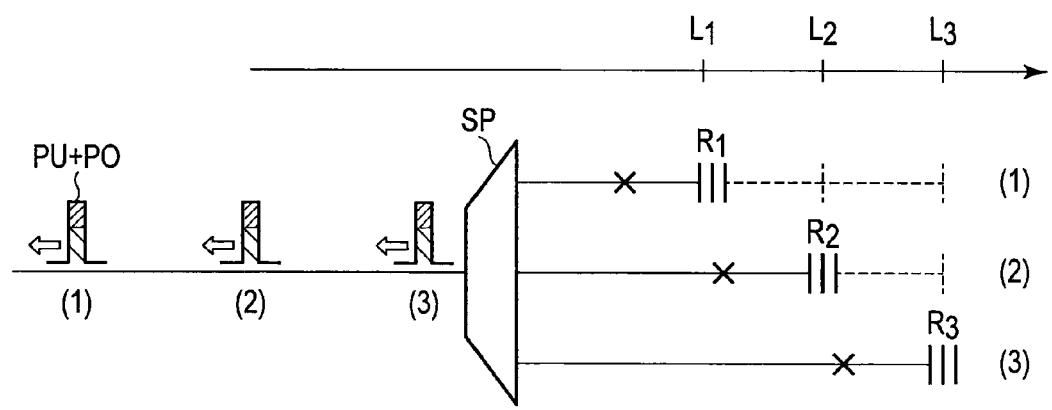
F I G. 12

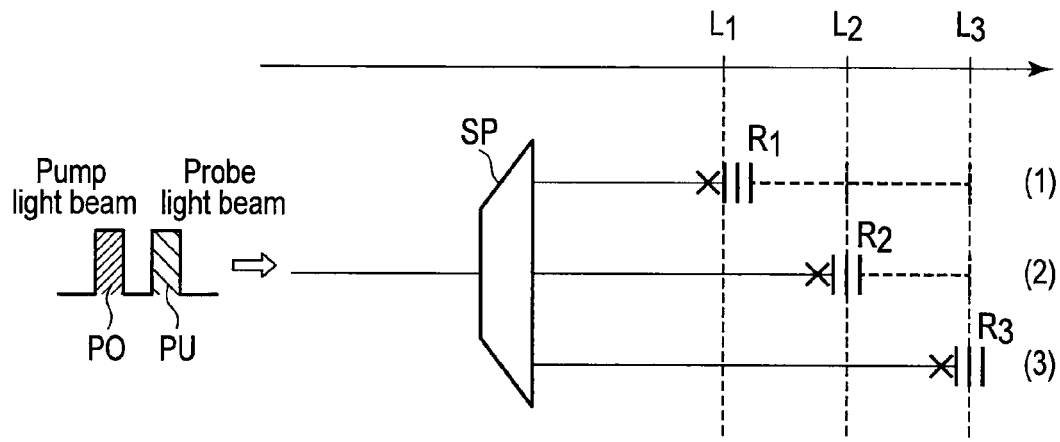
F I G. 14A
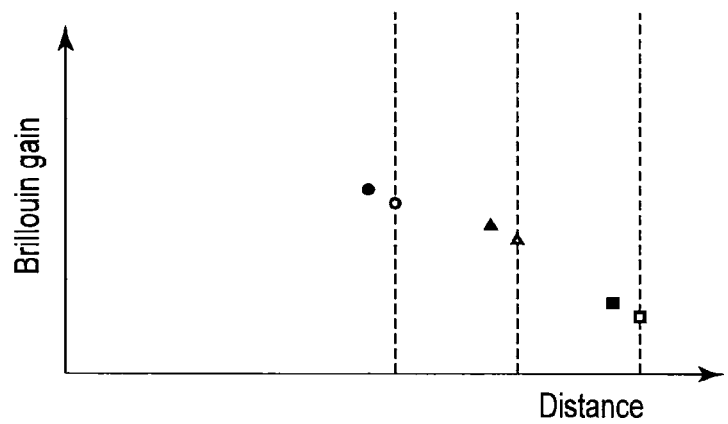
F I G. 14B

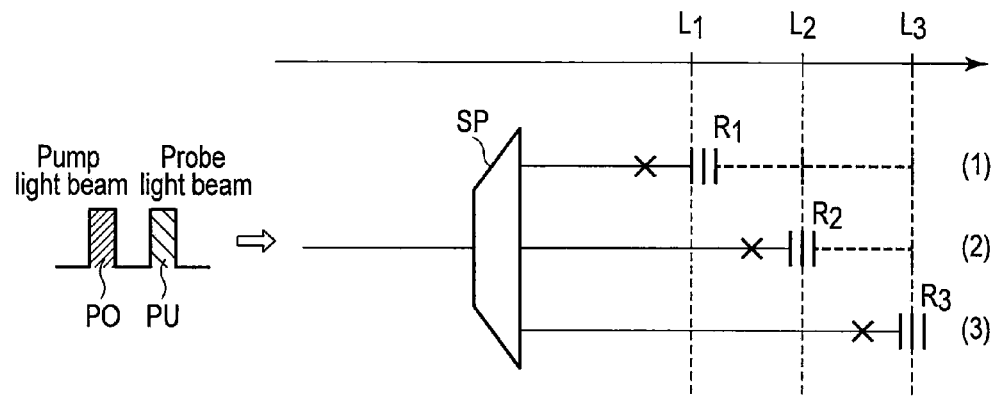
F I G. 15A
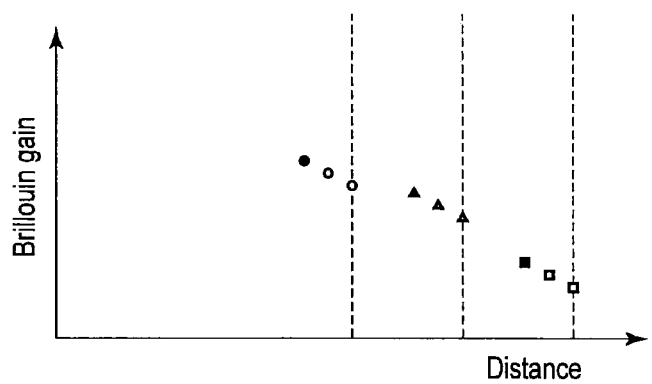
F I G. 15B

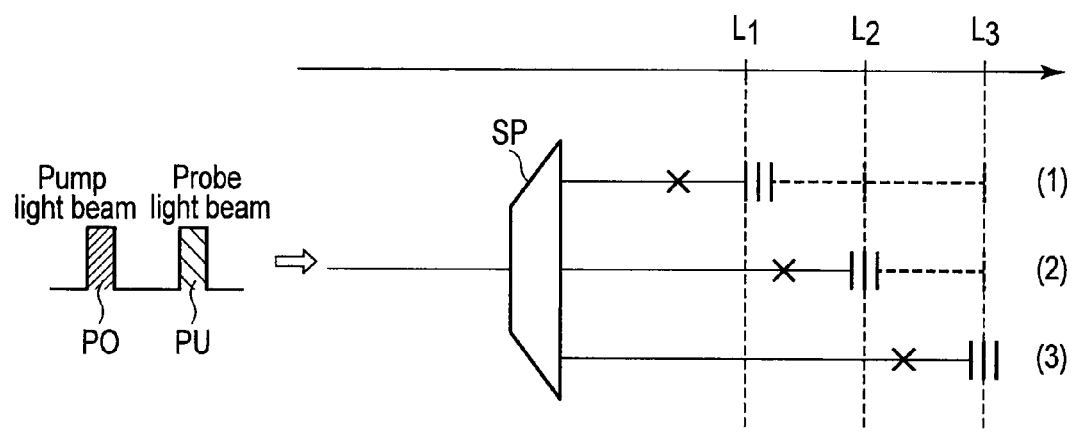
F I G. 16A
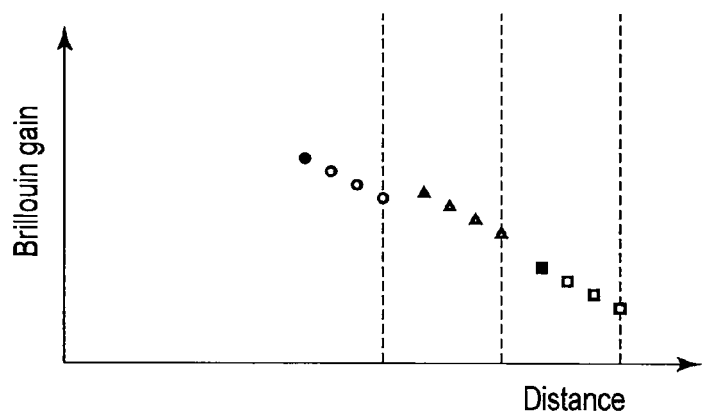
F I G. 16B

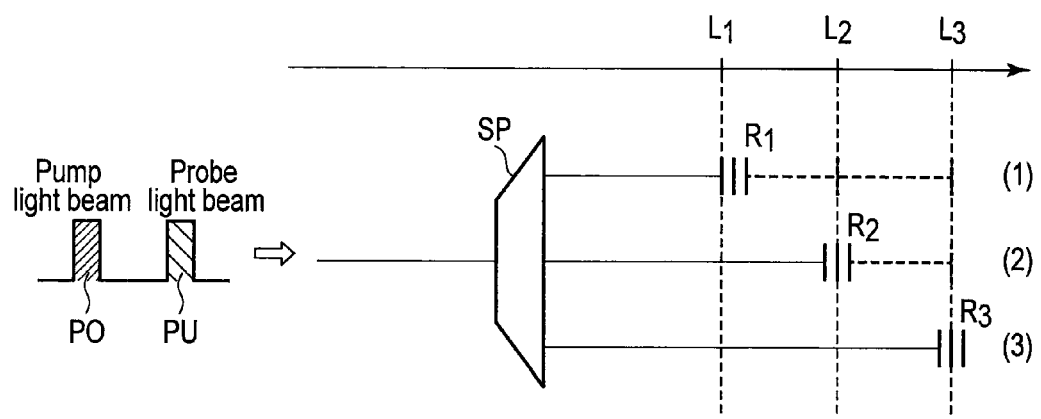
F I G. 17A
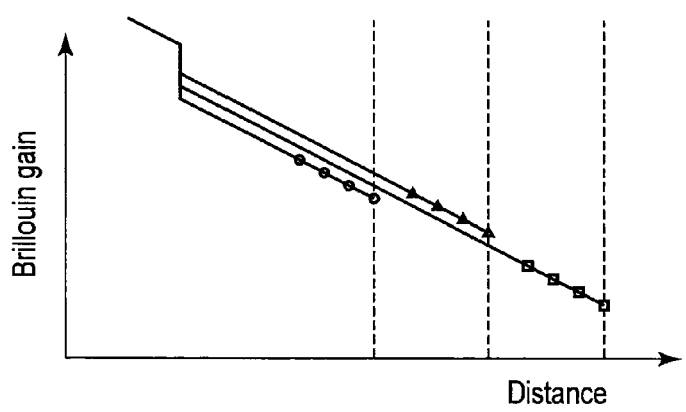
F I G. 17B

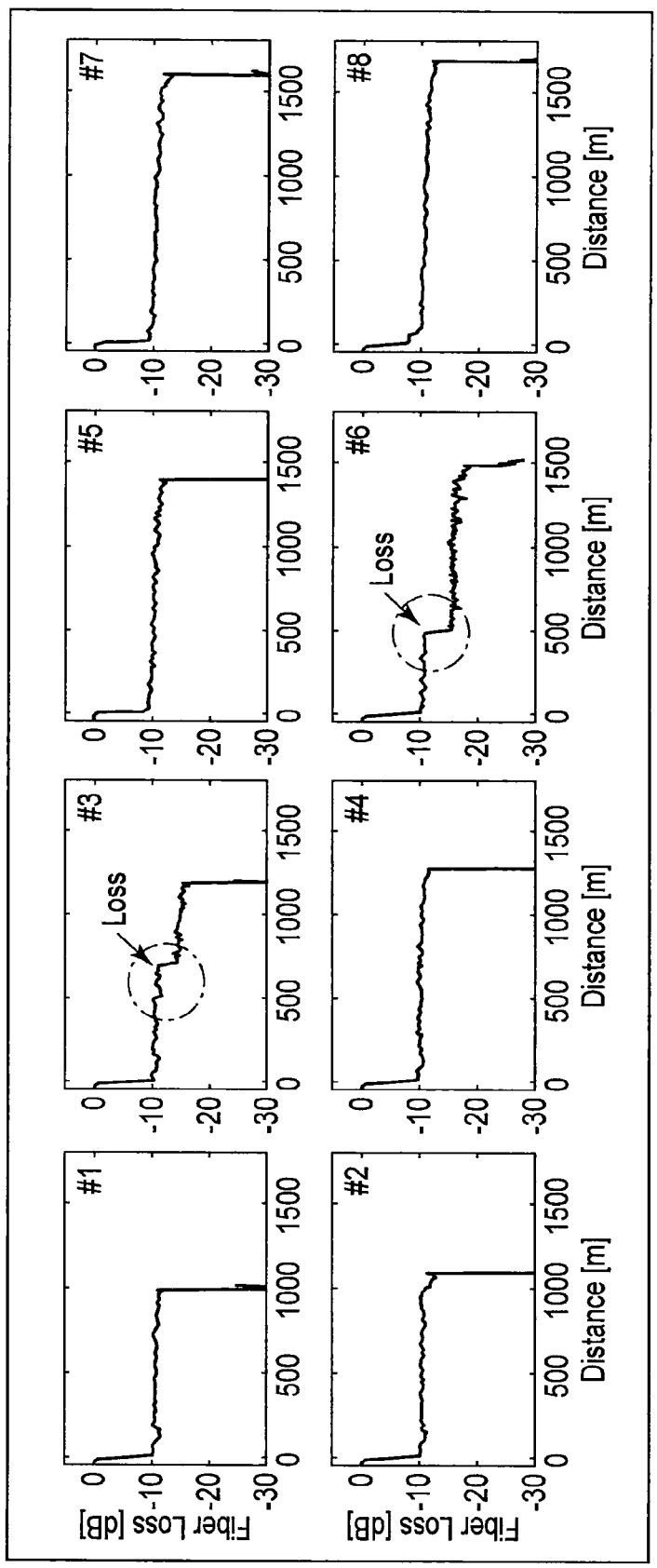
F I G. 18

OPTICAL FIBER LINE CHARACTERISTIC ANALYSIS APPARATUS AND ANALYSIS METHOD THEREOF

CROSS-REFERENCE TO RELATED APPLICATIONS

This is a U.S. national phase application under 35 USC 371 of International Application PCT/JP2012/064190 (not published in English), filed May 31, 2012, which claims priority to Japanese Patent Application 2011-122509, filed May 31, 2011.

TECHNICAL FIELD

The present invention relates to an optical fiber line characteristic analysis apparatus and an optical fiber line characteristic analysis method that individually measure the characteristics of optical split lines into which an optical fiber line of, for example, a passive optical network (PON) type is split by an optical splitter.

BACKGROUND ART

An optical communication system using an optical fiber line such as an optical fiber uses an optical pulse line monitoring apparatus in order to detect breakage of the optical fiber line or determine a fracture position. The optical pulse line monitoring apparatus utilizes generation of backscattered light with the same wavelength as the wavelength of light propagating through an optical fiber line and propagation of the backscattered light in the opposite direction.

That is, when an optical pulse is input to an optical fiber line as test light, the optical pulse continues to generate backscattered light until the optical pulse reaches a fracture point. A reflected light with the same wavelength as that of the test light is output from a facet of the optical fiber line to which the optical pulse has been input. The fracture position on the optical fiber line can be determined by measuring the duration of the backscattered light. An optical time domain reflectometer (OTDR) is a typical monitoring apparatus based on the above-described principle.

However, for the passive optical network (PON) optical split line, the optical pulse line monitoring apparatus has difficulty individually identifying branched optical fibers positioned on a user apparatus side with respect to an optical splitter or the states of an optical device (reflective filter), a splitter, a fiber connection component, and the like which are connected to the optical fiber line.

For example, a trunk optical fiber extended from a telecommunications carrier facility building is split into a plurality of optical fibers by an optical splitter. Test light is also uniformly distributed among the optical fibers (hereinafter referred to as "branched optical fibers") provided by the optical splitter. In this case, upon returning to an input end of the trunk optical fiber, reflected lights from branched optical fiber lines overlap at the optical splitter. This prevents which of the branched optical fibers is broken to be determined based on observed OTDR waveforms.

Thus, the existing optical pulse line monitoring apparatus is basically effective on a single optical fiber line and fails to be applied directly to optical split lines. Thus, a technique has been proposed which enables the optical pulse line monitoring apparatus to be applied to the optical split lines (see Non Patent Document 1 and Patent Document 1).

According to Non-Patent Document 1, an optical filter that reflects test light is installed upstream of user apparatuses as a termination filter so that an OTDR apparatus with a high resolution can measure the intensity of reflected light from each user apparatus. The technique has been reported to achieve an accuracy of 2 m, in terms of distance resolution, in branched optical fibers located downstream of the optical splitter.

However, this technique is limited to a level at which a defective branched optical fiber line is identified and a defective position is isolated, for example, which of the user apparatus and the optical fiber line is defective is determined, and fails to determine where in the branched optical fiber the defect is occurring.

On the other hand, Patent Document 1 proposes that an optical splitter comprise a wavelength multiplexer/demultiplexer of a diffraction grating type based on an array waveguide utilizing multiple-beam interference of light so that a wavelength variable light source can switch the wavelength of test light to select a test target optical fiber line. According to the proposed method, the wavelength of the wavelength variable light source is swept, an optical reflection processing section detects the wavelength of reflected light, and the wavelength of the test light is set based on the wavelength of the reflected light. Thus, the optical fiber lines can be individually monitored in association with the wavelength of the test light.

However, optical splitting devices with a wavelength routing function, typified by a wavelength multiplexer/demultiplexer of a diffraction grating type based on an array waveguide, are generally expensive. It is difficult, in terms of costs, to use such an optical splitting device for an access network optical system accommodating a large number of subscribers. Moreover, such optical components depend significantly on temperature and need addition of a temperature adjustment function. This leads to the need for high costs when the system is constructed.

CITATION LIST

Patent Literature

Patent Literature 1: JP 7-087017A

Non Patent Literature

Non Patent Literature 1: Y. Enomoto et al., "Over 31.5 dB dynamic range optical fiber line testing system with optical fiber fault isolation function 32 dB-branched PON", OFC2003 Technical Digest, paper ThAA3(2003), pp. 608-610

SUMMARY OF INVENTION

Technical Problem

As described above, the conventional OTDR analysis determines a distance from the input end based on a time from the input of test light until an optical receiver receives the test light. When this analysis method is used to measure a PON optical fiber line, reflected light beams from a plurality of split optical lines overlap, making separation of the reflected light beams into the respective branched optical fiber lines difficult. Thus, a technique has been proposed which uses an optical splitting device for an access network optical system. However, implementation of this technique needs changes in the configuration of existing outside optical facilities, resulting in the need for enormous costs.

In view of the above-described circumstances, it is an object of the present invention to provide an optical fiber line characteristic analysis apparatus and an optical fiber line characteristic analysis method which enable the characteristics of branched optical fiber lines to be individually, precisely, and inexpensively analyzed without the need to replace existing outside facilities.

Solution to Problem

An optical fiber line characteristic analysis apparatus according to the present invention is configured according to the following aspects.

(1) An aspect of the present invention provides an optical fiber line characteristic analysis apparatus that analyzes characteristics of a test target optical fiber line comprising a trunk optical fiber a first end of which is split into a plurality of branched optical fibers by an optical splitter with splitting ends to which respective first ends of the branched optical fibers are optically coupled, the apparatus including test light beam pulse generation means for generating a first test light beam and a second test light beam with different wavelengths, and generating a first test light beam pulse and a second test light beam pulse from the first and second test light beams with any time difference applied between the first test light beam pulse and the second test light beam pulse and synthesizing the first and second test light beam pulses, a plurality of optical reflection filters each disposed at a second end of a corresponding one of the branched optical fibers in the measurement target optical line to reflect light with the wavelengths of the first and second test light beams, while allowing light with other wavelengths to pass through, an optical circulator configured to input the test light beam pulses generated by the test light beam pulse generation means to the trunk optical fiber in the measurement target optical fiber line and to extract a reflected light output from an input end of the trunk optical fiber, an optical filter configured to extract stimulated Brillouin backscattered light from the reflected light, an optical receiver configured to receive the scattered light extracted by the optical filter and to convert the scattered light into an electrical signal, conversion means for converting the electrical signal into a digital signal, and an arithmetic processing device configured to measure the stimulated Brillouin backscattered light based on the digital signal and to analyze characteristics of the measurement target optical fiber line, wherein the arithmetic processing device measures the stimulated Brillouin backscattered light while varying a time difference between the first test light beam pulse and second test light beam pulse generated by the test light beam pulse generation means.

(2) In the apparatus in (1), a difference in frequency between the first test light beam and the second test light beam corresponds to a Brillouin frequency shift at which stimulated Brillouin backscattered light is generated in the measurement target optical fiber line.

(3) In the apparatus in (1), when a minimum value of a difference among the branched optical fibers in a length from a splitting point corresponding to the optical splitter to the optical reflection filter is denoted by $\Delta L$, light speed is denoted by $c$, and a refractive index of a measurement target optical fiber is denoted by $n$, a pulse width $\tau$ of the test light beam pulse is smaller than $2n\Delta L/c$.

(4) In the apparatus in (1), the arithmetic processing device measures the stimulated Brillouin scattering resulting from the first test light beam pulse and the second test light beam pulse, measures a distribution of the Brillouin scattered light with respect to a distance of each of the plurality of branched optical fibers, measures a time when the stimulated Brillouin scattered light in each of the plurality of branched optical fibers reaches the optical receiver, and analyzes individual loss distributions of the plurality of branched optical fibers based on results of the measurements.

(5) In the apparatus in (1), the arithmetic processing apparatus specifies a time difference between the first test light beam pulse and the second test light beam pulse, waits for a digital signal for generating the first and second test light beam pulses, upon receiving a digital signal based on the first test light beam pulse, determines which of the branched optical fibers has reflected the digital signal for the test light beam pulse, based on a time needed for arrival of the digital signal, analyzes the stimulated Brillouin scattered light based on the digital signal obtained, carries out an analysis process for outputting a result of the analysis, waits for the second test light beam pulse from the longest branched optical fiber to arrive, then changes the time difference between the first test light beam pulse and the second test light beam pulse, repeats the analysis process, and ends the series of analysis processes when a difference in input time between the first test light beam pulse and the second test light beam pulse is determined to be equal to $2nL/c$ when a maximum branched optical fiber length is denoted by $L$, light speed is denoted by $c$, and a refractive index of a measurement target optical fiber is denoted by $n$.

Furthermore, an optical fiber line characteristic analysis method is configured as follows.

(6) An aspect of the present invention provides an optical fiber line characteristic analysis method of analyzing characteristics of a test target optical fiber line comprising a trunk optical fiber a first end of which is split into a plurality of branched optical fibers by an optical splitter with splitting ends to which respective first ends of the branched optical fibers are optically coupled, the method including synthesizing a first test light beam pulse and a second test light beam pulse generated from a first test light beam and a second test light beam with different wavelengths with any time difference applied between the first test light beam pulse and the second test light beam pulse, to generate a test light beam pulse, disposing a plurality of optical reflection filters at respective second ends of the plurality of branched optical fibers of the test target optical fiber line, each of the optical reflection filters reflecting light with the wavelengths of the first and second test light beams, while allowing light with other wavelengths to pass through, inputting the first and second test light beam pulses to the trunk optical fiber of the test target optical fiber line, extracting a reflected light output from an input end of the trunk optical fiber, extracting stimulated Brillouin backscattered light from the reflected light, receiving and converting the extracted scattered light into an electrical signal, converting the electrical signal into a digital signal, and measuring the stimulated Brillouin backscattered light based on the digital signal with the time difference between the first test light beam pulse and the second test light beam pulse varied, and analyzing characteristics of the test target optical fiber line based on a result of the measurement.

(7) In the method in (6), a difference in frequency between the first test light beam and the second test light beam corresponds to a Brillouin frequency shift at which stimulated Brillouin backscattered light is generated in the measurement target optical fiber line.

(8) In the method in (6), when a minimum value of a difference among the branched optical fibers in a length from a splitting point corresponding to the optical splitter to the optical reflection filter is denoted by $\Delta L$, light speed is denoted by $c$, and a refractive index of the measurement target optical fiber line is denoted by n, a pulse width τ of the test light beam pulse is smaller than 2nΔL/c.

Advantageous Effects of Invention

As described above, the present invention utilizes the difference ΔL in length between the plurality of branched optical fibers into which the trunk optical fiber line is split at the splitting point by the optical splitter, prepares two types of test light with different wavelengths, pulses the two types of test light, applies an input time difference between the two types of pulsed test light, and inputs the resultant two types of pulsed test light to the measurement target optical fiber line. Thus, reflected light of the previously input pulsed test light (first test light beam) and the subsequently input pulsed test light (second test light beam pulse) propagate opposite each other to generate stimulated Brillouin backscattered light. Then, the optical receiver receives the stimulated Brillouin backscattered light. An output current from the optical receiver is analyzed at a time resolution of higher than 2nΔL/c (c is light speed). This enables determination of in which of a first branched optical fiber to an Nth branched optical fiber the stimulated Brillouin scattering has occurred. Consequently, a characteristic distribution can be determined for each branched optical fiber.

Thus, the present invention can provide an optical fiber line characteristic analysis apparatus and an optical fiber line characteristic analysis method which enable the characteristics of branched optical fiber lines to be individually, precisely, and inexpensively analyzed without the need to replace existing outside facilities.

BRIEF DESCRIPTION OF DRAWINGS

FIG. 3A is a diagram showing relations between a measurement target optical circuit in the analysis apparatus shown in FIG. 1 and a time when a first test light beam pulse reaches an optical receiver.

FIG. 3B is a diagram showing relations between the measurement target optical circuit in the analysis apparatus shown in FIG. 1 and the time when the first test light beam pulse reaches the optical receiver.

FIG. 4 is a flowchart showing the contents of processing by an arithmetic processing device shown in FIG. 1.

FIG. 9 is a situation continued from the state shown in FIG. 8.

FIG. 10 is a situation continued from the state shown in FIG. 9.

FIG. 11 is a situation continued from the state shown in FIG. 10.

FIG. 12 is a diagram continued from the state shown in FIG. 11 and showing that a probe optical pulse subjected to stimulated Brillouin scattering in a branched optical fiber line as a result of a collision against a pump optical pulse is output from an optical splitter to an optical receiver.

FIG. 14A is a diagram showing how the position of the collision is scanned by gradually increasing the difference in input time between the probe optical pulse and the pump optical pulse.

FIG. 14B is a diagram showing how the position of the collision is scanned by gradually increasing the difference in input time between the probe optical pulse and the pump optical pulse.

FIG. 15A is a diagram showing how the position of the collision is scanned by gradually increasing the difference in input time between the probe optical pulse and the pump optical pulse.

FIG. 15B is a diagram showing how the position of the collision is scanned by gradually increasing the difference in input time between the probe optical pulse and the pump optical pulse.

FIG. 16A is a diagram showing how the position of the collision is scanned by gradually increasing the difference in input time between the probe optical pulse and the pump optical pulse.

FIG. 16B is a diagram showing how the position of the collision is scanned by gradually increasing the difference in input time between the probe optical pulse and the pump optical pulse.

FIG. 17A is a diagram showing how the position of the collision is scanned by gradually increasing the difference in input time between the probe optical pulse and the pump optical pulse.

FIG. 17B is a diagram showing how the position of the collision is scanned by gradually increasing the difference in input time between the probe optical pulse and the pump optical pulse.

FIG. 18 is a waveform diagram showing individual loss distribution waveforms of the respective channels obtained by the above-described technique.

DESCRIPTION OF EMBODIMENTS

An embodiment of the present invention will be described with reference to the drawings. The embodiment described below is an example of a configuration of the present invention, and the present invention is not limited to the embodiment described below.

Figure 1:
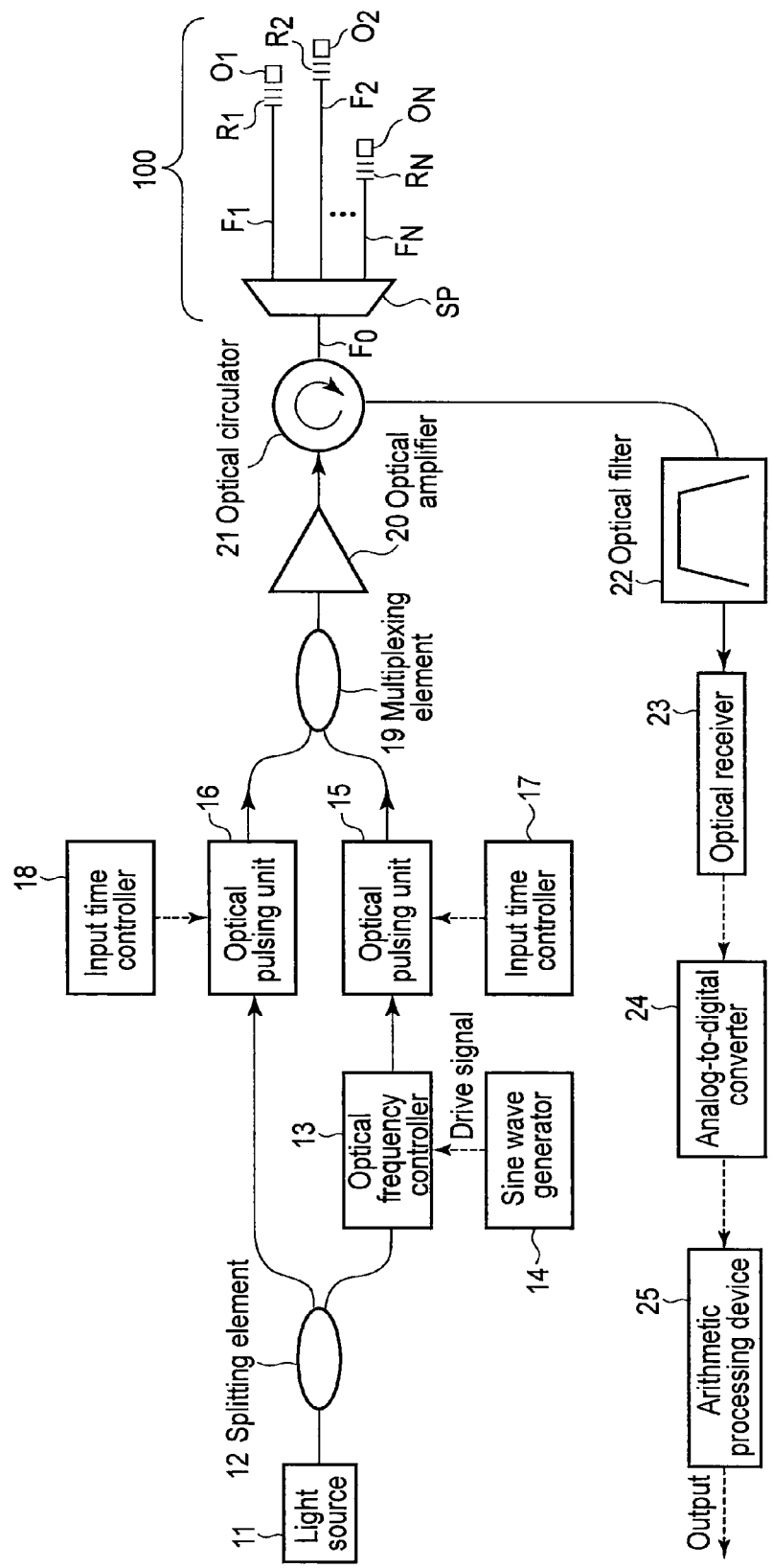
FIG. 1 is a block diagram showing a configuration of an optical fiber line characteristic analysis apparatus according to an embodiment of the present invention.

FIG. 1 is a block diagram showing a configuration of an optical fiber line characteristic analysis apparatus according to the embodiment of the present invention. In FIG. 1, 11 is a light source generating continuous light with an optical frequency $f_0$, and the continuous light output by the light source 11 is split into two beams by a splitting element 12. One of the resultant two beams is hereinafter referred to as a first test light beam (probe light beam). The other is hereinafter referred to as a second test light beam (pump light beam). The first test light beam is input to an optical frequency controller 13 and has the optical frequency $f_0$ thereof shifted by a specific frequency $f_B$. The optical frequency controller 13 may specifically be an external modulator with a function to vary the frequency of a modulation sideband according to the signal frequency of a sine wave generated by a sine wave generator 14. Alternatively, the optical frequency controller 13 may be a phase modulator, an amplitude modulator, or an SSB modulator which uses $LiNbO_3$.

The first test light beam and the second test light beam pulse are pulsed at $2n\Delta L/c$ or less by optical pulsing units 15 and 16, respectively. $\Delta L$ is the minimum value of a difference in length among N branched optical fibers, c is a speed at which light is transmitted in vacuum (light speed), and n is a refractive index for a measurement target optical fiber. The optical pulsing units 15 and 16 are specifically formed of acousto-optical modulators based on acousto-optical switches configured to pulse-drive acousto-optical elements or $LiNbO_3$ modulators based on waveguide switches configured to drive electrooptic elements using $LiNbO_3$.

Input time controllers 17 and 18 applies, to the optical pulsing units 15 and 16, respectively, a difference between the first test light beam pulse and the second test light beam pulse in a time when the pulse is input to a measurement target optical circuit 100 located downstream of the Input time controllers 17 and 18.

Specifically, the input time controllers 17 and 18 are configured to allow the optical pulsing units 15 and 16, which pulse the first test light beam and the second test light beam pulse, to optionally variably control modulation time for electrical pulses to be driven. That is, to obtain optical pulses, the optical devices (optical pulsing units) based on the acousto-optical modulators or $LiNbO_3$ modulators are modulated by electrical pulses, and continuous light beams input at the time of the modulation by the electrical pulses are pulsed. Timings when the optical devices are modulated are varied to control timings when the light beams are converted into optical pulses.

The optical pulses of the first test light beam and the second test light beam pulse subjected to the timing control as described above are multiplexed by a multiplexing element 19. Thus, a test light beam can be generated from two optical pulses with different input times and different optical frequencies (wavelengths).

Figure 2A:
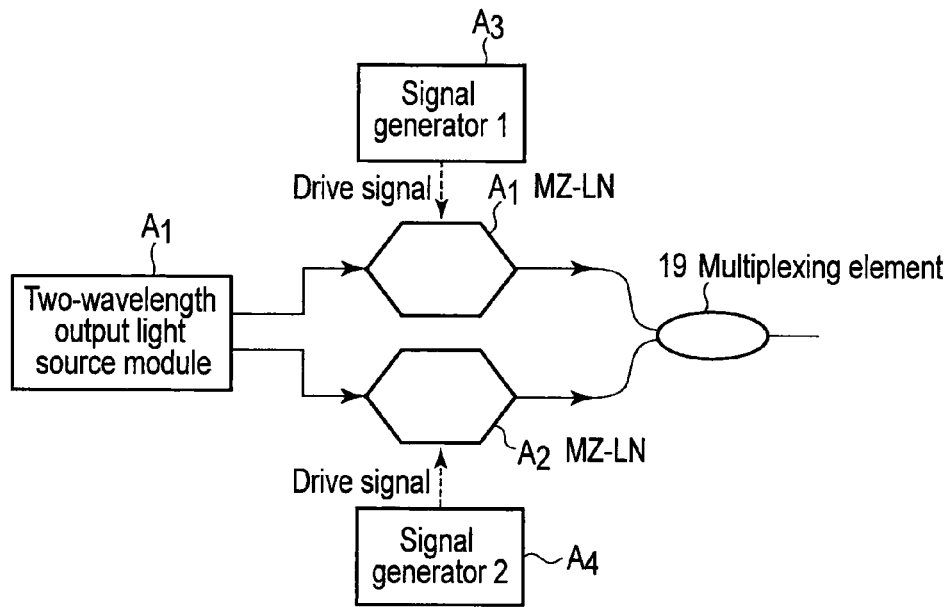
FIG. 2A is a diagram showing a configuration of two lines each with a combination of an optical pulsing unit and a input time controller provided in the analysis apparatus shown in FIG. 1, and a timing relation between drive pulse signals provided to the respective lines.

FIG. 2A shows an example of a configuration with a combination of the optical pulsing unit 15 and the input time controller 17 and a configuration with a combination of the optical pulsing unit 16 and the input time controller 18. In FIG. 2A, a light source module A1 outputs two continuous light beams with respective wavelengths which are input to the optical pulsing units 15 and 16, respectively, shown in FIG. 1.

Figure 2B:
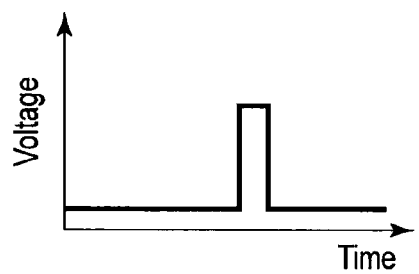
FIG. 2B is a diagram showing the configuration of the two lines each with the combination of the optical pulsing unit and the input time controller provided in the analysis apparatus shown in FIG. 1, and a timing relation between drive pulse signals provided to the respective lines.
Figure 2C:
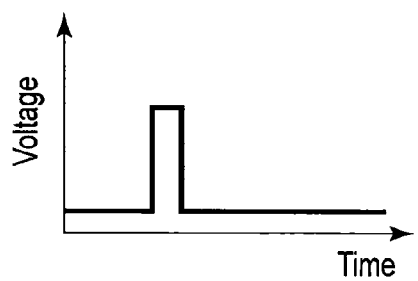
FIG. 2C is a diagram showing the configuration of the two lines each with the combination of the optical pulsing unit and the input time controller provided in the analysis apparatus shown in FIG. 1, and a timing relation between drive pulse signals provided to the respective lines.

The pair of continuous light beams output by the light source Module A1 are input to Mach-Zehnder amplitude modulators (MZ-LN) A2 and A3 that use $LiNbO_3$, and signals driving MZ-LNs A2 and A3 are converted into electrical signals to pulse the continuous light beams. Furthermore, a difference in a time when the pulse is input to the under measurement optical circuit 100 is applied by controlling timings for drive pulse signals generated by signal generators A4 and A5. FIG. 2B and FIG. 2C show an example of timings for the drive pulse signals generated by the signal generators A4 and A5.

The optical pulse of the first test light beam and the second test light beam multiplexed by the multiplexing element 19 has its optical power amplified by an optical amplifier 20. The optical pulse then passes through an optical circulator 21 and is input to a trunk optical fiber $F_0$ of the measurement target optical fiber line 100.

The measurement target optical fiber line 100 comprises the trunk optical fiber $F_0$, an optical splitter SP that distributes signal light input to the trunk optical fiber $F_0$ among the N split paths, optical fibers located after the optical splitter (hereinafter referred to as branched optical fibers) $F_1$ to $F_N$ through which signal light beams distributed by the optical splitter SP are transmitted to optical communication devices such as user terminals, and optical reflection filters $R_1$ to $R_N$ installed at terminals of the branched optical fibers $F_1$ to $F_N$.

The multiplexed optical pulse of the first test light beam and the second test light beam is split into N light beams by the optical splitter SP, which interact with one another in the branched optical fibers $F_1$ to $F_N$ to generate backscattered light based on stimulated Brillouin scattering. An optical signal generated in each of the branched optical fibers $F_1$ to $F_N$ and containing stimulated Brillouin backscattered light is fed back to the optical circulator 21, which guides the signal to an optical filter 22. The optical filter 22 extracts only the stimulated Brillouin backscattered light component, which is received by an optical receiver 23. The optical receiver 23 converts the stimulated Brillouin backscattered light component into a current signal and outputs the current signal.

The current signal output by the optical receiver 23 is converted into a digital signal by an analog-to-digital converter 24, which inputs the digital signal to an arithmetic processing device 25. The arithmetic processing device 25 carries out arithmetic processing on the input current value as described above and carries out an input time control process for the input time controllers 17 and 18 to determine a loss distribution with respect to distance.

Now, operation of the optical fiber line characteristic analysis apparatus according to the present embodiment configured as described above will be described.

The optical frequency controller 13, the optical pulsing units 15 and 16, and the optical receiver 23 meet the following conditions.

(Condition 1) The shift in frequency produced by the optical frequency controller 13 (the difference in frequency between the first test light beam and the second test light beam pulse) is equal to a Brillouin frequency shift.

(Condition 2) The optical pulsing units 15 and 16 have a pulse width $\tau$ smaller than the minimum value of the difference $2n\Delta L/c$ among reflected lights in a time needed to return from the terminal of the branched optical fibers $F_1$ to $F_N$.

(Condition 3) Each of the optical receiver 23 and the analog-to-digital converter 24 has a band in which the pulse width $\tau$ can be received.

Conditions 1 to 3 have the following meanings.

Condition 1 is necessary for the first test light beam pulse and the second test light beam pulse to cause stimulated Brillouin scattering.

Condition 2 is necessary to avoid a situation in which the pulse width $\tau$ of the optical pulsing units 15 and 16 is greater than the minimum value of the difference $2n\Delta L/c$ among reflected lights in a time needed to return from the terminal of the branched optical fibers $F_1$ to $F_N$, causing stimulated Brillouin scattered light beams in the respective optical fiber lines to overlap, preventing temporal isolation. In this case, $\Delta L$ is the minimum value of the difference in length among the branched optical fibers $F_1$ to $F_N$.

For condition 3, to allow an optical pulse with the pulse width τ to be more precisely measured, each of the optical receiver 23 and the analog-to-digital converter 24 needs to have a band greater than 1/τ.

The characteristic analysis method for the measurement target optical fiber line 100 will be described below which is carried out using the present embodiment when conditions 1 to 3 are met.

In this case, two test light beams with different wavelengths (a first test light beam and a second test light beam) are pulsed. The first test light beam is a probe light beam with an optical frequency $f_0 - f_B$. The second test light beam pulse is a pump light beam with an optical frequency $f_0$. $f_0$ is the optical frequency of the pump light beam, and $f_B$ is the shift in optical frequency caused by Brillouin backscattering.

First, an optical pulse of the first test light beam (hereinafter referred to as the first test light beam pulse) is input to the trunk optical fiber $F_0$ in the measurement target optical circuit 100. Then, $t_1$ seconds after the input of the first test light beam pulse, an optical pulse of the second test light beam pulse (hereinafter referred to as the second test light beam pulse) is input to the trunk optical fiber $F_0$. Each of the first test light beam pulse and the second test light beam pulse is split by the optical splitter SP into N light beams, which are output to the respective branched optical fibers $F_1$ to $F_N$.

(i) Measurement of Stimulated Brillouin Scattering Caused by the First and Second Test Light Beam Pulses If the first test light beam (probe light beam) and the second test light beam (pump light beam) differ from each by $f_B$ in frequency, when the first test light beam pulse and the second test light beam pulse propagate opposite each other, stimulated Brillouin scattering occurs to amplify the first test light beam as expressed by:

$$\alpha_B = \exp[\int_z^{z+\tau} g_B I_{pump}(z) dz] \quad (1)$$

where $\alpha_B$: amplification factor resulting from stimulated Brillouin scattering $g_B$: stimulated Brillouin scattering coefficient z: distance from the input end of each of the branched optical fibers $F_1$ to $F_N$ to the position to which the first test light beam and the second test light beam have propagated opposite each other $I_{pump}(z)$: intensity of the second test light beam (pump light beam) at a position corresponding to the distance z from the input end of each of the branched optical fibers F1 to FN.

τ: pulse width of the second test light beam.

When a loss in an optical fiber line #i of the branched optical fiber $F_i$ ($1 \le i \le N$) is denoted by $\alpha_i$ and a total loss involved in round trip through the optical fiber line #i of the branched optical fiber $F_i$ is denoted by $1/D_i$, the intensity $I_{probe}(2L_i)$, at the input end of the branched optical fiber $F_i$, of the first test light beam pulse reflected by an optical reflection filter $R_i$ at the terminal is expressed by:

$$I_{probe}(2L_i) = \frac{1}{D_i} I_{probe}(0) \alpha_B \quad (2)$$

$$= \frac{1}{D_i} I_{probe}(0) \cdot \exp\left[\int_z^{z+\tau} g_B \cdot I_{pump}(z) dz\right]$$

Formula (2) indicates that the intensity $I_{probe}(2L_i)$ of the first test light beam pulse, at the input end of the branched optical fiber $F_i$, is a function with only $I_{pump}(z)$. $I_{pump}(z)$ is expressed by:

$$I_{pump}(z) = I_{pump}(0) \exp(-\alpha_i z) \quad (3)$$

Hence, the use of Formula (3) allows Formula (2) to be expressed as:

$$\frac{1}{D_i} \exp\left[\int_z^{z+\tau} g_B I_{pump}(0) \exp(-\alpha_i z) dz\right] = \frac{I_{probe}(2L_i)}{I_{probe}(0)} \quad (4)$$

$$\int_z^{z+\tau} g_B I_{pump}(0) \exp(-\alpha_i z) dz = \ln\left(\frac{D_i \cdot I_{probe}(2L_i)}{I_{probe}(0)}\right)$$

$$\int_z^{z+\tau} g_B I_{pump}(0) \exp(-\alpha_i z) dz = \ln\left(\frac{D_i \cdot I_{probe}(2L_i)}{I_{probe}(0)}\right)$$

$$\int_z^{z+\tau} \exp(-\alpha_i z) dz = \frac{1}{g_B I_{pump}(0)} \ln\left(\frac{D_i \cdot I_{probe}(2L_i)}{I_{probe}(0)}\right)$$

Formula (4) indicates that analysis of the gain spectrum intensity of Brillouin scattered light allows acquisition of a value equivalent to a loss incurred up to the position to which the light beams have propagated opposite each other, integrated by the pulse width. The value is expressed by:

$$\int_z^{z+\tau} \exp(-\alpha_i z) dz$$

A reflected light $I_{probe}(2L_i)$ from each branched optical fiber $F_i$ is subjected to the same loss by the optical fiber extending from the optical splitter SP to the optical receiver 23. Hence, analyzing the characteristics of stimulated Brillouin scattering allows a fiber line loss to be measured.

(ii) Measurement of the Distribution of Brillouin Scattered Light with Respect to the Distance of the Branched Optical Fiber A length from the input of the measurement target optical circuit 100 to the terminal of the branched optical fiber $F_i$ is denoted by $L_i$. The first test light beam pulse is reflected by the optical reflection filter $R_i$ installed at the terminal of the branched optical fiber $F_i$. When the distance from the terminal of the branched optical fiber $F_i$ is denoted by L, the refractive index of the measurement target optical fiber used in the measurement target optical circuit 100 is denoted by n, and the light speed in vacuum is denoted by c, the reflected first test light beam pulse travels the distance $l = c/n \times t_1/2$ in $t_1/2$ seconds. Thus, when the distance from the input end is $l_{x1}$, the following formula holds true.

$$l_{x1} = L_a - \frac{c \cdot t_1}{2n} \quad (5)$$

Furthermore, the first test light beam pulse input to the measurement target optical fiber line 100 is split by the optical splitter SP, and each of the resultant light beams is reflected by the optical reflector $R_i$ disposed at the terminal of the branched optical fiber $F_i$. In this case, a time t when the light beam arrives at a position corresponding to the distance $l_{x1}$ from the input end is expressed by:

$$t = \frac{nL_a}{c} + \frac{t_1}{2} \quad (6)$$

The second test light beam pulse is input to the optical fiber line 100 $t_1$ seconds after the input of the first test light beam pulse. A distance from the input end at which the second test light beam pulse arrives $t_1$ seconds after the input of the first test light beam pulse is denoted by $l_{x2}$. Then, the distance $l_{x2}$ is expressed by:

$$l_{x2} = \frac{c}{n} \cdot (t - t_1) \qquad (7)$$
$$= L_a - \frac{c \cdot t_1}{2n}$$

Formula (5) and Formula (7) indicate that the first test light beam pulse and the second test light beam pulse propagate opposite each other at a position $l_{x1} = l_{x2}$. Furthermore, the first test light beam pulse and the second test light beam pulse propagate opposite each other $t_1/2$ seconds after the reflection by the optical reflection filter $R_i$ disposed at the terminal of the measurement target branched optical fiber $F_i$. That is, the position where the first test light beam pulse and the second test light beam pulse propagate opposite each other can be controlled by varying the difference t1 between the first test light beam pulse and the second test light beam pulse in the time when the optical pulse is input to the measurement target optical fiber $F_i$. This allows determination of the distribution of characteristics of stimulated Brillouin scattering with respect to distance.

(iii) Measurement of the Time when Stimulated Brillouin Scattered Light in the Optical Fiber Line #a (an Integer of 1≤a≤N) of the Branched Optical Fiber $F_a$ Arrives at the Optical Receiver 23 Disposed at the Input End The time when the first test light beam pulse arrives at the optical receiver 23 is denoted by $t_{da}$. The first test light beam pulse is reflected by an optical reflection filter Ra disposed at the terminal of a branched optical fiber Fa and transmitted to the optical receiver 23. Thus, the arrival time is expressed by:

$$t_{da} = \frac{2nL_a}{c} \qquad (8)$$

A time $t_{db}$ when a first test light beam pulse returning from an optical fiber line #b (an integer of 1≤b≤N) of another branched optical fiber $F_b$ arrives at the optical receiver 23 is expressed by:

$$t_{db} = \frac{2nL_b}{c} \qquad (9)$$

Hence, the difference in time when the optical pulse arrives at the optical receiver 23 is expressed by:

$$|t_{da} - t_{db}| = \frac{2n|L_a - L_b|}{c} \qquad (10)$$

When La≠Lb, the time when the light beam pulse arrives at the optical receiver 23 differs.

The first test light beam pulse is assumed to have a pulse width τ. Then, when the following formula holds true (condition 2), $$\tau \le |t_{da} - t_{db}| \qquad (11)$$

the first test light beam pulses having returned from the respective branched optical fibers do not overlap at the optical splitter SP. Consequently, from which of the optical fiber lines the first test light beam pulse has returned can be temporally determined by measuring the time when the light beam pulse arrives at the optical receiver 23.

FIG. 3A and FIG. 3B show relations between the lengths of the branched optical fibers $F_1$ to $F_N$ in the measurement target optical circuit 100 and the time when the first test light beam pulse arrives at the optical receiver 23. In this case, three branched optical fiber lines are illustrated. The lengths of the three branched optical fibers are assumed to have a relation indicated by:

$$L_1 < L_3 < L_2 \qquad (12)$$

Then, for the time when the first test light beam pulse arrives at the optical receiver 23, the following relation holds true.

$$t_{d1} < t_{d3} < t_{d2} \qquad (13)$$

When the results of measurements in (i) to (iii) and conditions 1 to 4 are met, the present embodiment enables the loss distribution of the optical fibers located downstream of the splitting point of the PON optical fiber line to be measured using only the configuration of the existing outside facility (the optical splitter, the branched optical fibers, and the optical reflection filters installed at the terminals of the branched optical fibers).

Based on the measurements, the arithmetic processing device 25 carries out arithmetic processing in accordance with a flowchart shown in FIG. 4.

First, for the input time controller 17 and 18, the difference t between the first test light beam pulse and the second test light beam pulse in the time when the light beam pulse is input to the measurement target optical circuit 100 is set to t1 (step S1). The procedure waits for the first test light beam pulse and the second test light beam pulse to be input (steps S2 and S3). When the first test light beam pulse is input, from which of the branched optical fibers the digital signal of the test light beam pulse has been reflected is determined based on the time of the arrival of the first test light beam pulse (step S4). Stimulated Brillouin scattered light is analyzed based on the digital signal obtained (step S5). The result of the analysis is output (step S6). The procedure determines whether the second test light beam pulse from the longest branched optical fiber has arrived (step S7). If the second test light beam pulse from the longest branched optical fiber has arrived, the procedure determines whether the input time difference t=$t_1$+Δt is equal to 2nL/c (step S8). If the input time difference t=$t_1$+Δt is not equal to 2nL/c, the input time difference t=$t_1$+Δt is set (step S9). The procedure returns to step Sin to repeat the processing in steps S1 to S8. If the procedure determines in step S9 that the input time difference t=$t_1$+Δt is equal to 2nL/c, the series of analysis processes is ended.

The procedure of the measurement according to the present embodiment will be

1. Test light with two types of wavelengths is prepared, the time difference $t_1$ is specified, and the test light is pulsed to generate a first test light beam pulse and a second test light beam pulse.

2. The first test light beam pulse and the second test light beam pulse are input to the measurement target optical circuit 100 with the time difference $t_1$ applied between the light beam pulses.

3. The first test light beam pulses (including Brillouin scattered light) from the branched optical fibers $F_1$ to $F_N$ which arrive at different times are received and converted into current signals, which are then converted into digital signals.

4. Based on the time of arrival of each of the obtained digital signals at the optical receiver 23, to which of the branched optical fibers the digital signal of the test light beam has been input is determined. The stimulated Brillouin scattered light is then analyzed.

5. The procedure waits for the second test light beam pulse to arrive at the optical receiver 23. When the second test light beam pulse arrives, the procedure returns to process 1 to adjust the time difference $t_1$. Processes 2 to 5 are repeatedly carried out. When the input time difference is 2nL/c, the series of processes is ended.

All of processes 1 to 5 are controlled by a computer.

Thus, according to the present embodiment, a difference of ΔL or greater is applied among the lengths of the N branched optical fibers $F_i$ formed at the splitting point by the optical splitter SP. The first test light beam pulse and second test light beam pulse with different wavelengths are input to the measurement target optical circuit 100 with the input time difference set based on the difference ΔL in fiber length applied between the light beam pulses. The reflected light of the previously input first test light beam pulse and the subsequently input second test light beam pulse propagate opposite each other to generate stimulated Brillouin backscattered light. The scattered light is received by the optical receiver 23, and an output current from the optical receiver 23 is analyzed at a time resolution of higher than 2nΔL/c. This enables determination of in which of the first to Nth branched optical fibers the stimulated Brillouin scattering has occurred, allowing the characteristic distribution of each branched optical fiber to be determined.

The present embodiment will be described in further detail taking a specific example.

Figure 5A:
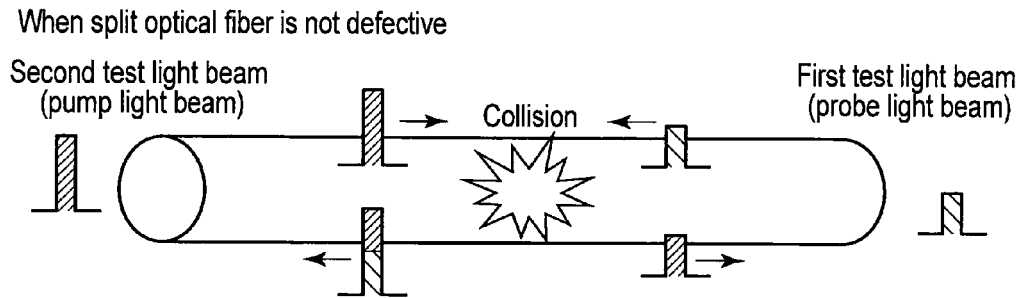
FIG. 5A is a diagram showing the basic concept of a loss measurement method based on a stimulated Brillouin scattering analysis which method is used in the embodiment.
Figure 5B:
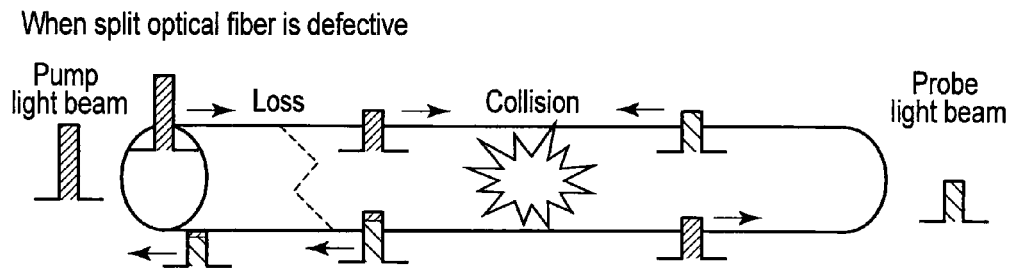
FIG. 5B is a diagram showing the basic concept of the loss measurement method based on the stimulated Brillouin scattering analysis which method is used in the embodiment.

FIG. 5A and FIG. 5B show the basic concept of a loss measurement method based on stimulated Brillouin scattering analysis which method is used according to the above-described embodiment. FIG. 5A shows that the branched optical fiber is not defective. FIG. 5B shows that the branched optical fiber is defective.

The pulse of the first test light beam (hereinafter referred to as the probe light beam) previously input to the branched optical fiber is reflected by the optical reflection filter R disposed at the terminal of the branched optical fiber and collides against the subsequently input second test light beam (hereinafter referred to as the pump light beam) in the middle of the branched optical fiber.

At this time, if the branched optical fiber is not defective, the feedback probe light beam is subjected to stimulated Brillouin scattering (Brillouin amplification) according to the intensity of the pulse of the pump light beam colliding against the probe light beam as shown in FIG. 5A. In contrast, if the branched optical fiber is defective, the pulses of both the probe light beam and the pump light beam are attenuated at the defective position as shown in FIG. 5B. Thus, the pulse of the already attenuated feedback probe light beam is subjected to stimulated Brillouin scattering at the intensity of the attenuated pump light beam. The pulse of the probe light beam subjected to the stimulated Brillouin scattering suffers a further loss at the defective part. Consequently, the optical intensity of the extracted probe light beam is much lower than when the branched optical fiber is not defective. Therefore, analyzing a gain resulting from the stimulated Brillouin scattering allows the loss incurred by the pulse of the pump light beam up to the collision position.

Now, a method for identifying a branched optical fiber line of a defective branched optical fiber will be described with reference to FIG. 6 to FIG. 12.

Figure 6:
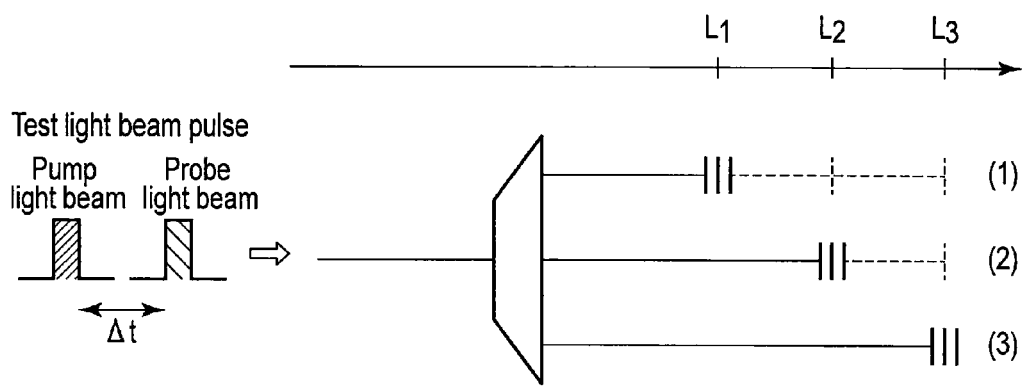
FIG. 6 is a diagram illustrating a method for identifying a branched optical fiber line of a defective branched optical fiber according to the embodiment.

FIG. 6 shows a configuration for which when a probe light beam and a pump light beam are input to branched optical fiber lines (1), (2), and (3) of a first branched optical fiber to a third branched optical fiber with a time difference Δt applied between the probe light beam pulse and the pump light beam pulse, a defective optical fiber line is assumed to be identified based on the feedback time difference of the probe light beam pulse. The branched optical fiber lines (1), (2), and (3) are assumed to have lengths $L_1$, $L_2$, and $L_3$ ($L_1 < L_2 < L_3$). Different wavelengths with a difference in Brillouin frequency are selected for the probe light beam and the pump light beam. The individual pulse widths are set smaller than double the difference in length between the branched optical fiber lines.

Figure 7:
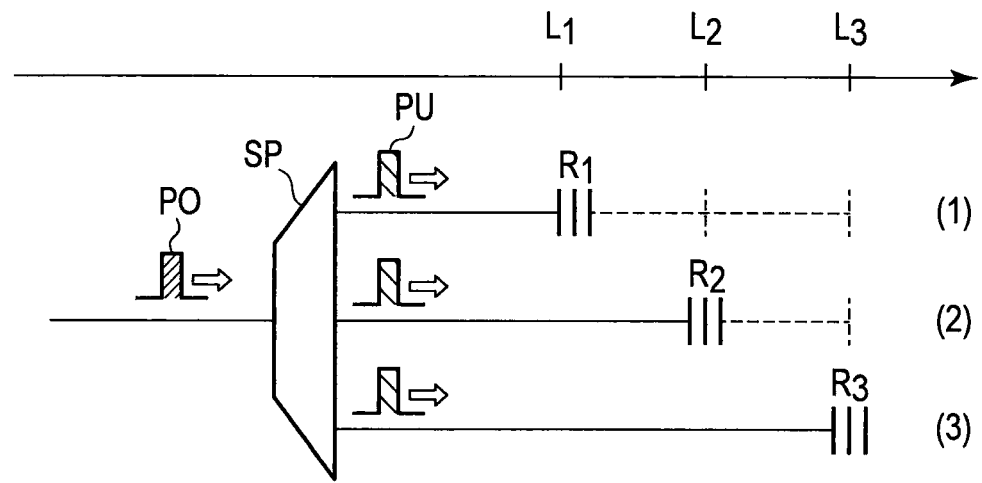
FIG. 7 is a situation continued from the state shown in FIG. 6.

FIG. 7 shows a situation which is continued from the state shown in FIG. 6 and in which a probe light beam pulse PU is input to each of the branched optical fiber lines (1), (2), and (3) by the optical splitter SP.

Figure 8:
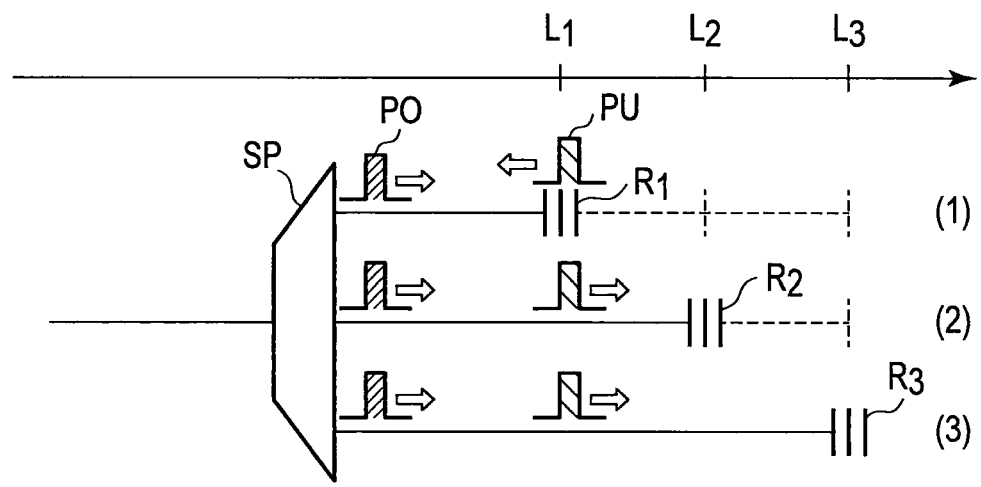
FIG. 8 is a situation continued from the state shown in FIG. 7.

FIG. 8 shows a situation which is continued from the state shown in FIG. 7 and in which the probe light beam pulse PU split by the optical splitter SP and input to the first branched optical fiber line (1) is reflected by the optical reflection filter $R_1$ located at the terminal of the first branched optical fiber line (1), whereas a pump light beam PO is input to each of the branched optical fiber lines (1), (2), and (3) by the optical splitter SP.

FIG. 9 shows a situation which is continued from the state shown in FIG. 8 and in which the probe light beam pulse PU reflected in the first branched optical fiber line (1) collides against the split pump light beam pulse. At this time, the probe light beam pulse PU in the first optical fiber line (1) is subjected to stimulated Brillouin scattering (Brillouin amplification) according to the intensity of the pump light beam pulse PO colliding against the probe light beam pulse.

FIG. 10 shows a situation which is continued from the state shown in FIG. 8 and in which the probe light beam pulse subjected to the stimulated Brillouin scattering in the first branched optical fiber line (1) returns to the optical splitter SP and in which the pump light beam pulse PO input to the second branched optical fiber line (2) collides against the probe light beam pulse PU reflected by the optical reflection filter $R_2$ and in which the probe light beam pulse PU is reflected by the optical reflection filter $R_3$ on the third branched optical fiber line (3). At this time, the probe light beam pulse PU in the second optical fiber line (2) is subjected to stimulated Brillouin scattering (Brillouin amplification) according to the intensity of the pump light beam pulse PO colliding against the probe light beam pulse.

FIG. 11 shows a situation which is continued from the state shown in FIG. 10 and in which, in the first branched optical fiber line (1), the probe light beam pulse PU is output from the optical splitter SP to the optical receiver 23 and in which, in the second branched optical fiber line (2), the probe light beam pulse PU ends the collision and in which, in the third branched optical fiber line (3), the pump light beam pulse PO input to the second branched optical fiber line (2) collides against the probe light beam pulse PU reflected by the optical reflection filter R2. At this time, the probe light beam pulse PU in the third optical fiber line (3) is subjected to stimulated Brillouin scattering (Brillouin amplification) according to the intensity of the pump light beam pulse PO colliding against the probe light beam pulse.

FIG. 12 shows a situation which is continued from the state shown in FIG. 11 and in which, in the first, second, and third branched optical fiber lines (1), (2), and (3), the probe light beam pulse PU subjected to stimulated Brillouin scattering as a result of the collision against the pump light beam pulse PO is output to the optical receiver 23.

As is apparent from FIG. 6 to FIG. 12, the branched optical fiber lines can be easily identified based on the time difference between reflected lights of the probe light beam pulse.

Now, measurement of the distribution of stimulated Brillouin scattering with respect to distance will be described with reference to FIG. 13 to FIG. 18.

FIG. 13A, FIG. 13B, FIG. 14A, FIG. 14B, FIG. 15A, FIG. 15B, FIG. 16A, FIG. 16B, FIG. 17A, and FIG. 17B show that, in the configuration shown in FIG. 6, the position of a collision is scanned by varying, though a gradual increase, the input time difference between the probe light beam pulse PU and the pump light beam pulse PO.

Figure 13A:
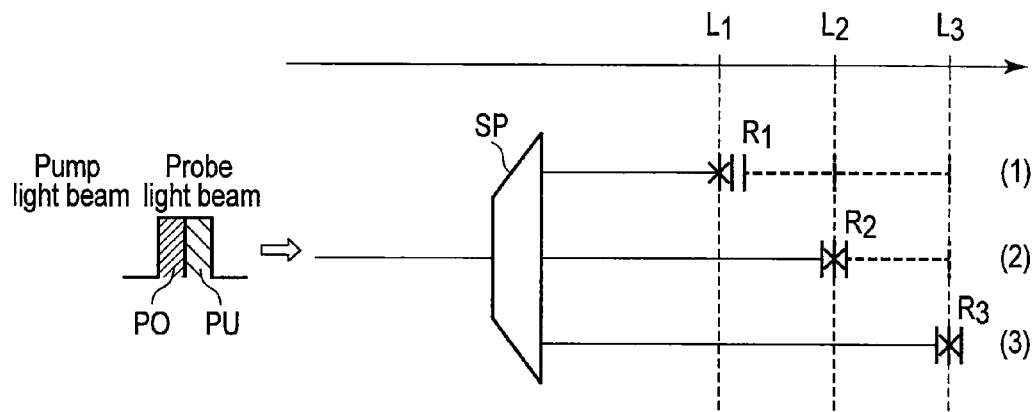
FIG. 13A is a diagram showing how the position of the collision is scanned by gradually increasing the difference in input time between the probe optical pulse and the pump optical pulse.
Figure 13B:
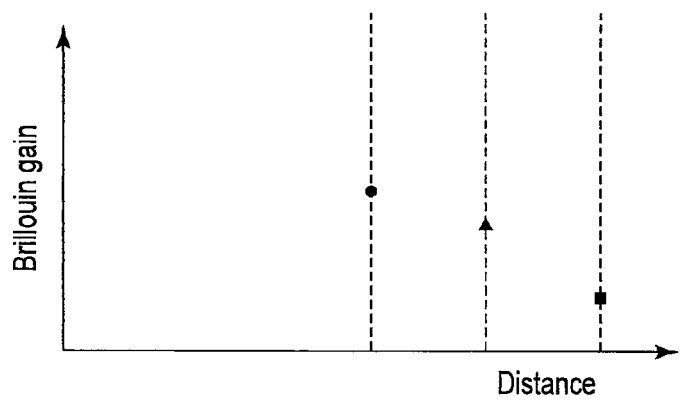
FIG. 13B is a diagram showing how the position of the collision is scanned by gradually increasing the difference in input time between the probe optical pulse and the pump optical pulse.

FIG. 13A shows a case where the input time difference t=0. At this time, the pump light beam pulse PO collides against the probe light beam pulse PU input to the first to third branched optical fiber lines (1), (2), and (3) immediately after the probe light beam pulse PU is reflected by the optical reflection filters $R_1$, $R_2$, and $R_3$ positioned at the terminals of the respective branched optical fiber lines. Then, as shown in FIG. 13B, a Brillouin gain is obtained at positions corresponding to the distances $L_1$, $L_2$, and $L_3$.

FIG. 14A shows a case where the input time difference $t=t_1$. In this case, a collision occurs at a position corresponding to the distance corresponding to the change in input time difference, and thus, a Brillouin gain is obtained at positions upstream of the positions corresponding to the distances $L_1$, $L_2$, and $L_3$, as shown in FIG. 14B.

FIG. 15A shows a case where the input time difference $t=t_1+2\Delta t$. In this case, a collision occurs at a position corresponding to the distance corresponding to the change in input time difference, and thus, a Brillouin gain is obtained at positions further upstream of the positions corresponding to the distances $L_1$, $L_2$, and $L_3$, as shown in FIG. 15B.

FIG. 16A shows a case where the input time difference $t=t_1+3\Delta t$. In this case, a collision occurs at a position corresponding to the distance corresponding to the change in input time difference, and thus, a Brillouin gain is obtained at positions further upstream of the positions corresponding to the distances $L_1$, $L_2$, and $L_3$, as shown in FIG. 16B.

Finally, the input time difference between the probe light beam PU and the pump light beam PO is equivalent to double the maximum length L1. Thus, as shown in FIG. 17B, Brillouin gain characteristics are obtained which correspond to the distances of the respective branched optical fiber lines (1), (2), and (3). Then, individual loss distributions can be acquired for the respective branched optical fiber lines.

FIG. 18 shows the individual loss distribution waveforms of the respective channels obtained using the above-described technique when space resolution is 10 m and when the number of branched optical fiber lines corresponds to eight channels #1 to #8. FIG. 18 shows that a loss of 3 dB and a loss of 5 dB occurring in channels #3 and #6, respectively, can be measured and that, for the other branched optical fiber lines, measurement of the Brillouin gain can be achieved without being affected by loss.

Therefore, the present embodiment allows the characteristics of branched optical fiber lines to be individually, precisely, and inexpensively without the need to replace existing outside facilities.

The stimulated Brillouin scattering enables measurement of distortion caused by optical attenuation, temperature, bending, or the like in an optical medium. The optical fiber line characteristics as used herein refer to the optical attenuation with respect to distance, the position of a reflection peak, the position of a bending failure, the degree of bending, the position of a disconnection failure, and the change in temperature with respect to distance.

The present invention is not limited to the above-described embodiment proper. In practice, the embodiment can be carried out with the components thereof varied without departing from the spirit of the present invention. Furthermore, various inventions can be formed by appropriately combining a plurality of the components disclosed in the embodiment. For example, any of the components illustrated in the embodiment may be deleted. Moreover, the embodiment may be combined with components according to a different embodiment.

REFERENCE SIGNS LIST

11 . . . light source, 12 . . . splitting element, 13 . . . optical frequency controller, 14 . . . sine wave generator, 15 and 16 . . . optical pulsing units, 17 and 18 . . . input time controllers, 100 . . . measurement target optical circuit, 19 . . . multiplexing element, A1 . . . light source module, A2 and A3 . . . Mach-Zehnder amplitude modulators (MZ-LN), A4 and A5 . . . signal generators, 20 . . . optical amplifier, 21 . . . optical circulator, $F_0$ . . . trunk optical fiber, SP . . . optical splitter, $F_1$ to $F_N$ . . . branched optical fibers, $R_1$ to $R_N$ . . . optical reflection filters, 22 . . . optical filter, 23 . . . optical receiver, 24 . . . A/D converter, 25 . . . arithmetic processing device

The invention claimed is:

1. An optical fiber line characteristic analysis apparatus that analyzes characteristics of a test target optical fiber line comprising a trunk optical fiber a first end of which is split into a plurality of branched optical fibers by an optical splitter with splitting ends to which respective first ends of the branched optical fibers are optically coupled, the apparatus comprising:

test light beam pulse generator configured to generate a first test light beam and a second test light beam with different wavelengths, and to generate a first test light beam pulse and a second test light beam pulse from the first and second test light beams with any time difference applied between the first test light beam pulse and the second test light beam pulse and to synthese the first and second test light beam pulses;

a plurality of optical reflection filters each disposed at a second end of a corresponding one of the branched optical fibers in the measurement target optical line to reflect light with the wavelengths of the first and second test light beams, while allowing light with other wavelengths to pass through;

an optical circulator configured to input the test light beam pulses generated by the test light beam pulse generator to the trunk optical fiber in the measurement target optical fiber line and to extract a reflected light output from an input end of the trunk optical fiber;

an optical filter configured to extract stimulated Brillouin backscattered light from the reflected light;

an optical receiver configured to receive the scattered light extracted by the optical filter and to convert the scattered light into an electrical signal;

a converter configured to convert the electrical signal into a digital signal; and an arithmetic processing device configured to measure the stimulated Brillouin backscattered light based on the digital signal and to analyze characteristics of the measurement target optical fiber line, wherein the arithmetic processing device measures the stimulated Brillouin backscattered light while varying a time difference between the first test light beam pulse and second test light beam pulse generated by the test light beam pulse generator.

2. The branched optical fiber line characteristic analysis apparatus according to claim 1, a difference in frequency between the first test light beam and the second test light beam corresponds to a Brillouin frequency shift at which stimulated Brillouin backscattered light is generated in the measurement target optical fiber line.

3. The branched optical fiber line characteristic analysis apparatus according to claim 1, when a minimum value of a difference among the branched optical fibers in a length from a splitting point corresponding to the optical splitter to the optical reflection filter is denoted by $\Delta L$, light speed is denoted by c, and a refractive index of a measurement target optical fiber is denoted by n, a pulse width $\tau$ of the test light beam pulse is smaller than $2n\Delta L/c$.

4. The branched optical fiber line characteristic analysis apparatus according to claim 1, the arithmetic processing device measures the stimulated Brillouin scattering resulting from the first test light beam pulse and the second test light beam pulse, measures a distribution of the Brillouin scattered light with respect to a distance of each of the plurality of branched optical fibers, measures a time when the stimulated Brillouin scattered light in each of the plurality of branched optical fibers reaches the optical receiver, and analyzes individual loss distributions of the plurality of branched optical fibers based on results of the measurements.

5. The branched optical fiber line characteristic analysis apparatus according to claim 1, the arithmetic processing apparatus specifies a time difference between the first test light beam pulse and the second test light beam pulse, waits for a digital signal for generating the first and second test light beam pulses, upon receiving a digital signal based on the first test light beam pulse, determines which of the branched optical fibers has reflected the digital signal for the test light beam pulse, based on a time needed for arrival of the digital signal, analyzes the stimulated Brillouin scattered light based on the digital signal obtained, and carries out an analysis process for outputting a result of the analysis, waits for the second test light beam pulse from the longest branched optical fiber to arrive, then changes the time difference between the first test light beam pulse and the second test light beam pulse, repeats the analysis process, and ends the series of analysis processes when a difference in input time between the first test light beam pulse and the second test light beam pulse is determined to be equal to 2nL/c where a maximum branched optical fiber length is denoted by L, light speed is denoted by c, and a refractive index of a measurement target optical fiber is denoted by n.

6. An optical fiber line characteristic analysis method of analyzing characteristics of a test target optical fiber line comprising a trunk optical fiber a first end of which is split into a plurality of branched optical fibers by an optical splitter with splitting ends to which respective first ends of the branched optical fibers are optically coupled, the method comprising:

synthesizing a first test light beam pulse and a second test light beam pulse generated from a first test light beam and a second test light beam with different wavelengths with any time difference applied between the first test light beam pulse and the second test light beam pulse, to generate a test light beam pulse;

disposing a plurality of optical reflection filters at respective second ends of the plurality of branched optical fibers of the test target optical fiber line, each of the optical reflection filters reflecting light with the wavelengths of the first and second test light beams, while allowing light with other wavelengths to pass through;

inputting the first and second test light beam pulses to the trunk optical fiber of the test target optical fiber line;

extracting a reflected light output from an input end of the trunk optical fiber;

extracting stimulated Brillouin backscattered light from the reflected light;

receiving and converting the extracted scattered light into an electrical signal;

converting the electrical signal into a digital signal; and measuring the stimulated Brillouin backscattered light based on the digital signal with the time difference between the first test light beam pulse and the second test light beam pulse varied, and analyzing characteristics of the test target optical fiber line based on a result of the measurement.

7. The branched optical fiber characteristic analysis method according to claim 6, characterized in that a difference in frequency between the first test light beam and the second test light beam corresponds to a Brillouin frequency shift at which stimulated Brillouin backscattered light is generated in the measurement target optical fiber line.

8. The branched optical fiber characteristic analysis method according to claim 6, characterized in that when a minimum value of a difference among the branched optical fibers in a length from a splitting point corresponding to the optical splitter to the optical reflection filter is denoted by $\Delta L$, light speed is denoted by c, and a refractive index of a measurement target optical fiber line is denoted by n, a pulse width $\tau$ of the test light beam pulse is smaller than $2n\Delta L/c$.

* * * * *